United States Patent Office 3,233,215
Patented Feb. 1, 1966

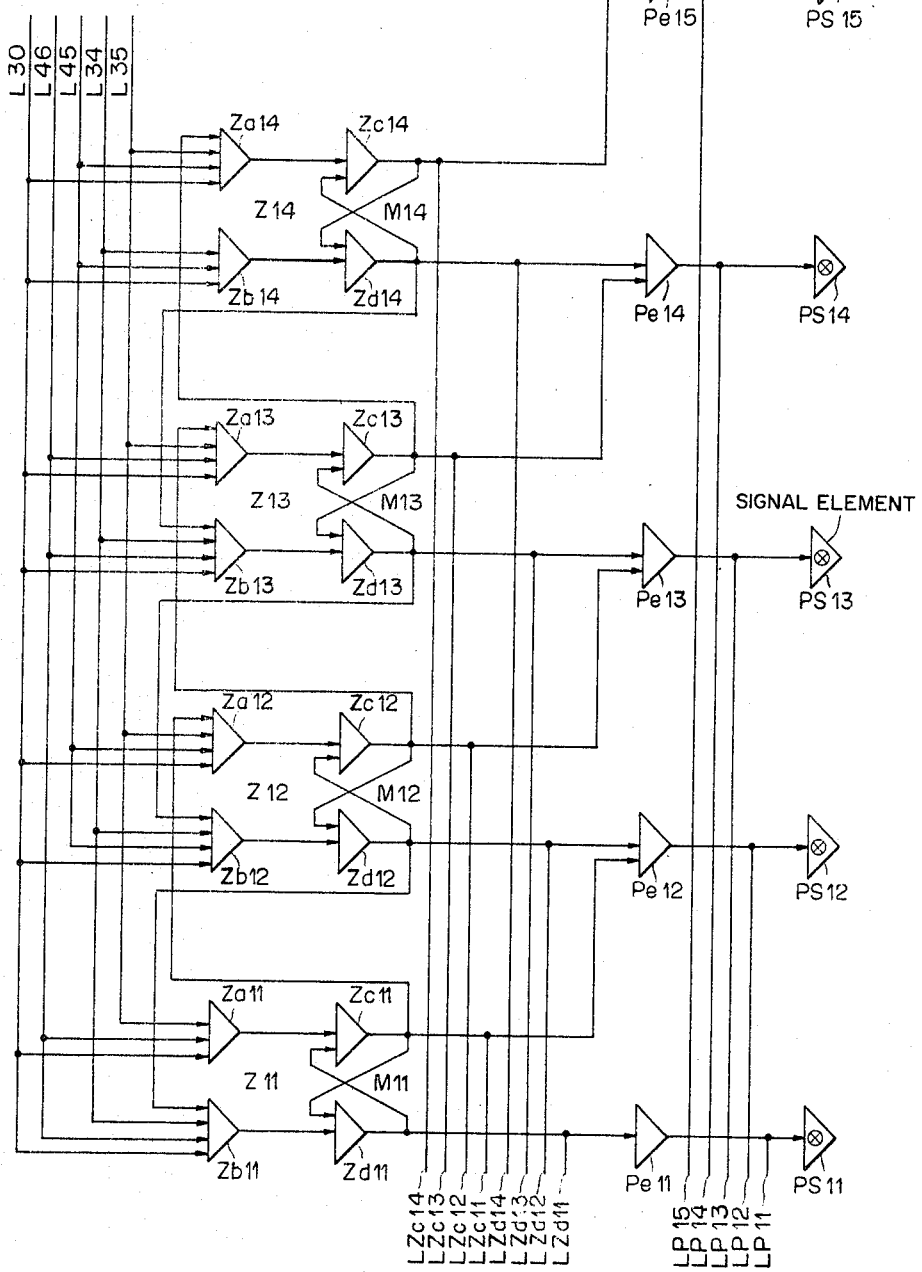

3,233,215
ELEVATOR CONTROL SYSTEM HAVING A STEP-BY-STEP SWITCHING DEVICE
Marcel Schibli and Marcel Leroux, Geneva, Switzerland, assignors to Schweizerische Wagons- und Aufzugefabrik A.-G., Schlieren-Zurich, Zurich, Switzerland
Filed Aug. 17, 1960, Ser. No. 50,142
Claims priority, application Switzerland, Aug. 25, 1959, 77,374
2 Claims. (Cl. 340—21)

The present invention relates to step-by-step switching device comprising static elements acted upon by signals of a signal sequence produced by signal generators which may be employed in a control system for elevators.

In some known step-by-step switching devices having static elements for the control of elevators, a control unit is associated with each stop whereby the starting position of a control unit, responsive to a control signal, indicates the position of the cabin. With any change of the position of the cabin the control signal does not only modify the starting value or state of the subsequent control unit but also the initial value or state of the control unit just left. Thus the starting values of the control unit above and below of the one influenced by the signal are equal. This makes impossible the direct use of the output values of the control units for indicating the travel direction.

It is a prime object of the present invention to provide a step-by-step switching device permitting, with the smallest possible number of unitary static elements, the ascertaining of the position of the step-by-step switching device and which in addition also gives output values unequivocally determining whether the step-by-step switching device is below or above a determinated position. This is absolutely necessary for example to determine the direction of travel. This is accomplished by the provision of apparatus wherein signals act in such manner upon zone units that a signal modifies the output values of one such unit only, whereby the output values of each such unit present, previous to the action of the corresponding signal is in one of two states and subsequent to the action of this signal the other of said two states.

In order to prevent the step-by-step switching device from switching several steps with only one signal, it has been proposed to provide a decelerating or additional memory element for each control unit. This expenditure for additional elements can be avoided according to the invention by having a step limiter responsive to positioning elements and to the direction of travel or responsive to the signal of the generator and to positioning elements acting upon the zone unit in such manner that the step-by-step switching device switches one step only for each signal of the generator.

Other features and advantages of the invention will become apparent from the description now to follow of preferred embodiments thereof, given by way of example only, and in which reference will be made to the accompanying drawings showing an elevator plant. In these drawings:

FIG. 2a illustrates zone units and corresponding positioning and signal elements for a step-by-step switching device having two opposite directions of movement;

Figure 1:
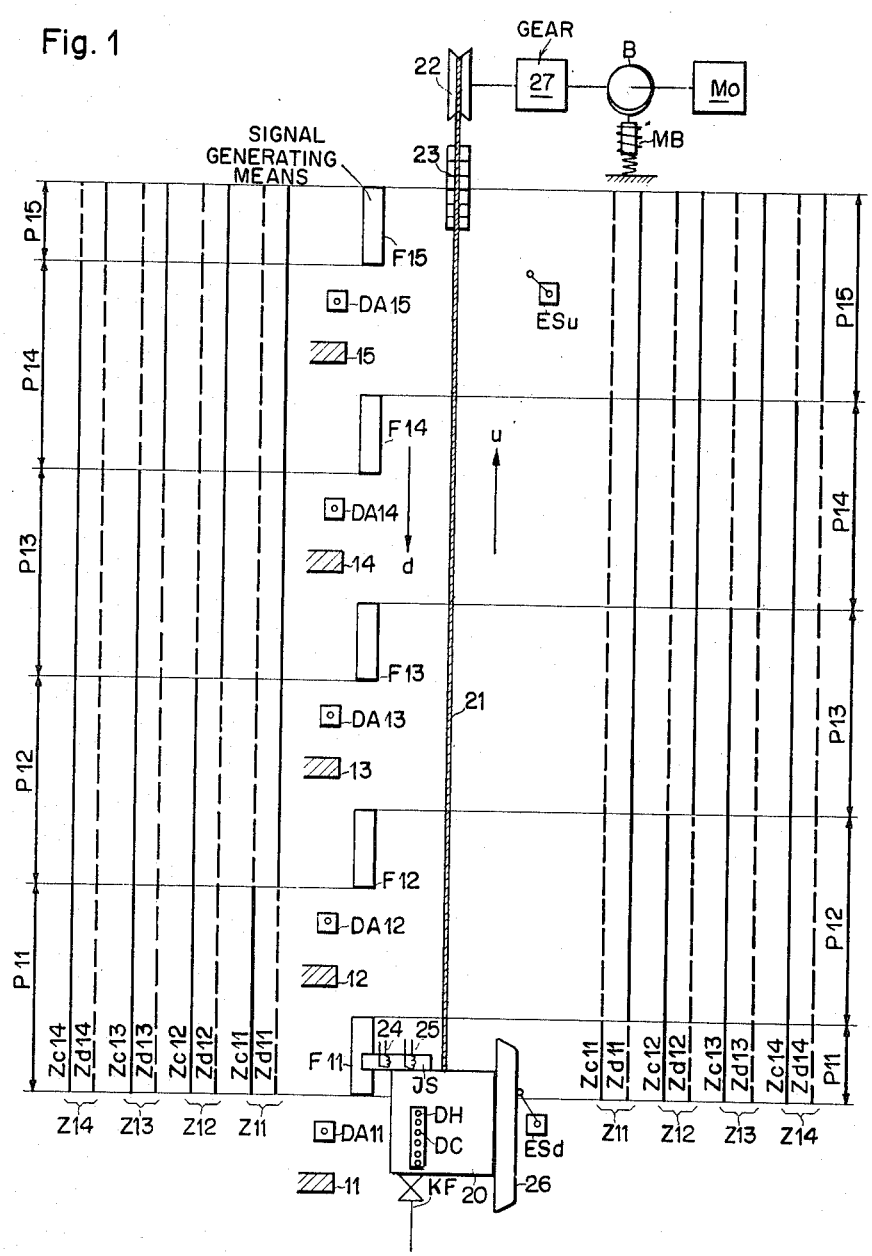
FIG. 1 illustrates the elevator plant in which the travel distance of the cabin is divided into signal zones.

Referring now to the drawings in FIG. 1, reference numeral 20 designates an elevator cabin connected by means of cables 21 and over a driving disc 22 with a counter-weight 23. The driving disc 22 is mounted on the slowly rotating shaft of a gear 27 driven by an induction motor Mo. A brake B is mounted between the gear 27 and the motor Mo and is actuated by a magnet MB.

The cabin 20 can make the stops 11 to 15. These stops are provided with outside call buttons DA11–15. In the cabin 20 itself there are arranged circular buttons DC. On the top of the cabin 20 is arranged a signal generator in form of an induction switch JS having a primary winding 24 and a secondary winding 25. The primary winding 24 supplied with A.C. produces in the secondary winding 25 over an air gap an output A.C. which is transformed in a known way in a rectifier into a D.C. signal. The shaft contains lugs or signal generating means F11–F15 which, during the passage of the cabin 20, project into the airgap of the induction switch JS and interrupt the D.C. signal so as to produce a signal sequence. In other words, as the cabin 20 is traveling there is a constant D.C. signal which is interrupted whenever the induction switch JS passes by one of the lugs F11 to F15. The D.C. at that time then shifts to another level which may be zero. Further a slide path 26 provided on the cabin 20 operates a pair of end switches ED$d$ and ES$u$ at the end stops. If the end switch ES$d$ or ES$u$ respectively is operated by the slide 26 an output signal 0 is produced at this switch.

FIG. 1 further shows that the elevator travel distance is divided into $n-1$ zones whereby $n$ indicates the number of the stops. To each of these zones is associated a zone unit having outputs Z$c$ and Z$d$, i.e., Z$c$11, Z$d$11, ... Z$c$14, Z$d$14. These zone units are hereinafter described with reference to FIGURE 2a. Each zone unit can generate two signals which may be characterized by signal values of 1 and 0. For example, zone unit Z11 has outputs Z$c$11 and Z$d$12. Outputs Z$c$11 and Z$c$12 can assume signal values of 1 and 0. When output Z$c$11 is 1, output Z$d$11 is zero, and vice-versa. In FIGURE 1 the uninterrupted lines correspond to a signal value 1 and the interrupted lines to a signal value 0, whereby the value 1 of the output Z$c$ represents the distance below the corresponding lug F to the lower end stop ES$d$ and the value 1 of the element Z$d$ represents the distance of the corresponding lug F to the upper end stop ES$a$. A signal value is designated by 1 or 0 respectively according to whether it presents a voltage or not with respect to a reference potential in the corresponding conductor.

The output of the induction switch JS from a lug F leads to a modification of the output values of the corresponding of zone unit. Since the output caused by the lug F starts the signal change the place of this change is different for the upward movement $u$ and for the downward movement $d$ as appears from FIGURE 1. In order to determine the position of the cabin 20 use is made of a further element, namely a so-called position element P$e$, hereinafter described with respect to FIGURE 2$a$, which is capable to evaluate the output values of two adjacent zone units whereby this position is indicated by the distances P11, P12, etc. From the following description it will appear that the output values of the zone units are further used to determine the travel direction.

Figure 2:
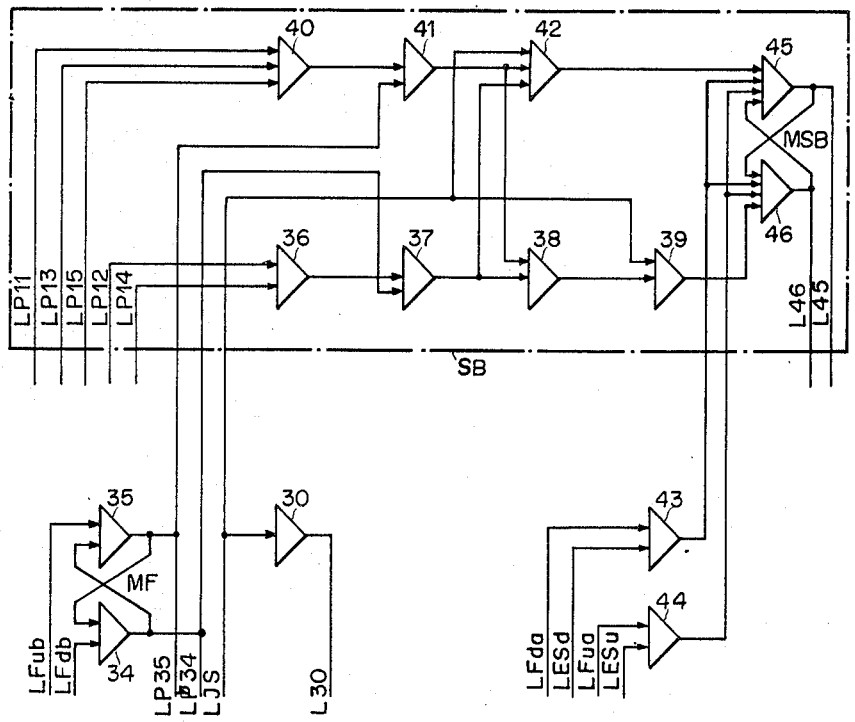
FIG. 2 represents a step limiter for a step-by-step switching device having two opposite directions of movement.
Figure 5:
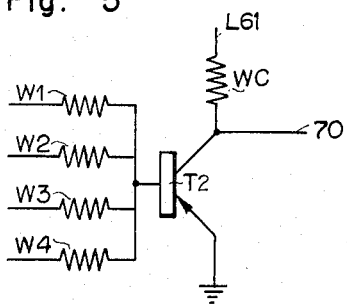
FIG. 5 is a static element shown as a transistor and other circuitry to provide a "nor"-element.

For the description of the step-by-step switching device acording to FIGURES 2 and 2$a$ it will be assumed that the cabin 20 is at the stop 11. Further the embodiment of the control is based on a static element, hereinafter more fully described with respect to FIGURE 5 which produces an output signal 1 when all input signals have the value 0 and producing an output signal 0 as soon as at least one input signal takes the value 1. Such a static element is generally designated as a logical "nor"-element. The lugs F are adjusted in such manner that the corresponding lug projects into the air gap of the induction switch JS when the cabin 20 stops at a stop. At that time, the secondary winding 25 produces no signal so that the output of JS=0.

Figure 3:
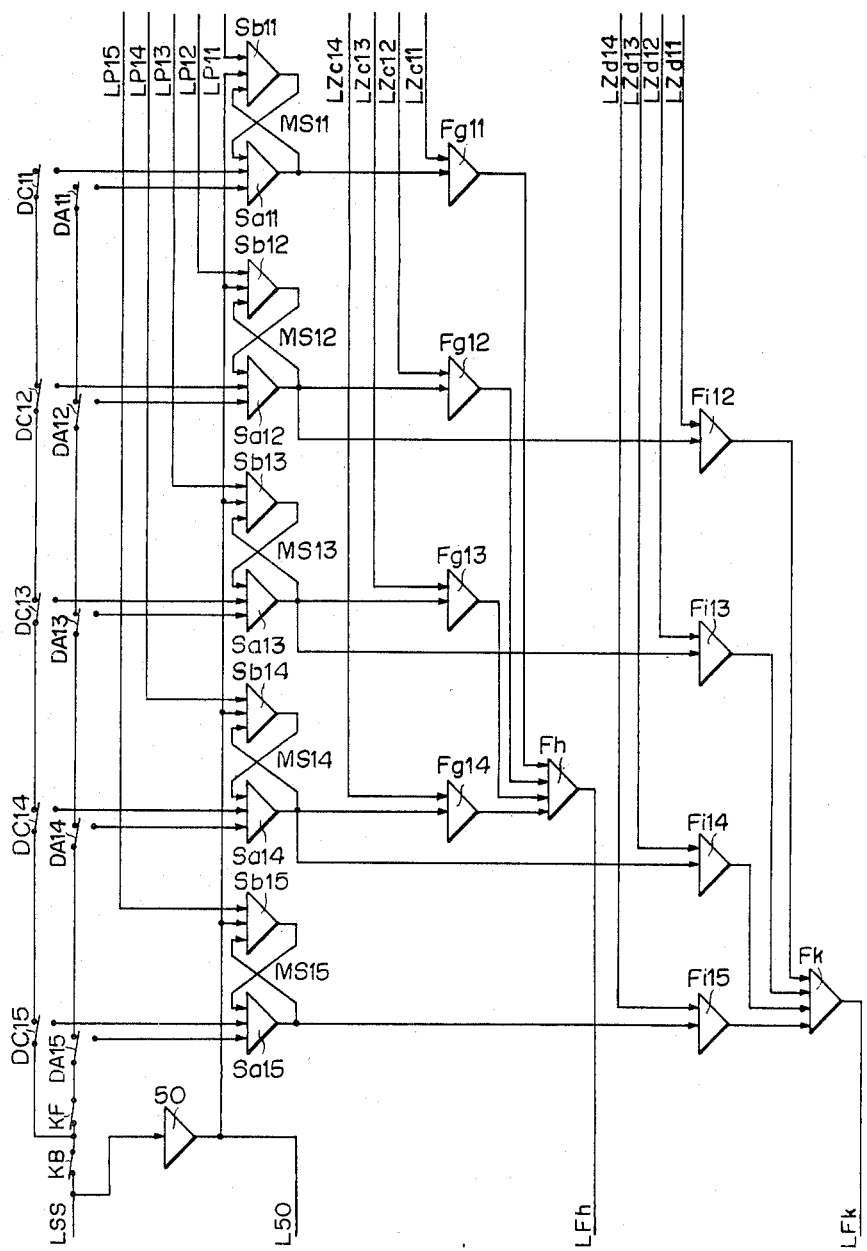
FIGS. 3 and 3a show a diagram of a floor control.

The induction switch JS is connected according to FIGURE 2 by means of a lead LJS with an element 30 the output of which acts on a lead L30. In accordance with the direction of travelling of the cabin 20 and, as shown in FIGURE 3$a$, the floor control produces signals of direction onto leads LF$ub$ for upward travelling and LF$db$ for downward travelling. Returning to FIGURE 2 the lead LF$ub$ leads to the first input of one element 35 of a memory element MF. The lead LF$db$ is connected to the first input of the other element 34. The output of element 35 serves as a second input to element 34 and is further connected with a lead L35. The output of element 34 serves as a second input to element 35 and is further connected to a lead L34.

An element 40 receives three inputs LP11, LP13 and LP15 coming from the corresponding position elements P$e$. The output of element 40 serves as a first input to an element 41 the second input of which is connected to lead L35.

A further element 36 receives two inputs LP12 and LP14 again coming from corresponding position elements P$e$. The output of element 36 serves as a first input to an element 37 the second input of which leads to lead L34. The output of element 37 acts onto the first inputs of the elements 38 and 42. The second inputs of these elements lead to the output of element 41. The third input of element 42 is connected to the lead LJS. The output of element 42 supplies the first input of an element 45 of a memory element MSB. The output of element 38 is connected with a first input of element 39 and the second input thereof is connected to the lead LJS. The output of element 39 acts as first input of the other elements 46 of the memory element MSB. The output of element 45 is connected on the one hand to the second input of element 46 and on the other hand to a lead L45. The output of element 46 leads on the one hand to the second input of element 45 and on the other hand to a lead L46. The described elements 36 to 42 as well as the memory element MSB form the so-called step limiter designated by SB in FIGURE 2.

Advantageously the step-by-step switching device is provided with a correcting means setting it into the corresponding starting position at the end stops, should the step-by-step device have been disturbed by outside influences. The correcting means consists of elements 43 and 44. The output of end switch ES$d$ is transmitted over a lead LES$d$ to the first input of element 43. A lead LF$da$ coming from the floor control (FIGURE 3$a$) acts as second input to element 43 the output of which serves as a third input to the elements 45 and 46. The element 44 has inputs LF$ua$ and LES$u$ and its output is connected as a fourth input to the elements 45 and 46.

The diagram shown in FIGURE 2$a$ represents on the one hand $n$–1 zone units designated by Z11 to Z14 and on the other hand the position units generally designated by P and identical with the number of floors. A zone unit Z consists of a memory element M having elements Z$c$ and Z$d$ and correspondingly connected elements Z$a$ and Z$b$ responsive to the travelling direction. A position unit consists of a position element P$e$ and of a signal element PS.

The elements Z$a$ and Z$b$ usually comprise four inputs. The first input is connected to the lead L30. The second input of elements Z$a$ and Z$b$ which are designated with an even index of number are connected with the lead L45 and the second input of these elements Z$a$ and Z$b$ having odd index of numbers are connected with lead L46. The third input of the elements Z$a$ is connected with the lead L35 and the third input of the elements Z$b$ is connected with lead L34. The fourth input of the elements Z$a$ leads to the output of the corresponding elements Z$c$ having the index of numbers minus 1 and the fourth input of the elements Z$b$ leads to the output of the corresponding elements Z$d$ with the index of number plus 1. For example, the fourth input of element Z$a$13 is connected to the output Z$c$12 and the fourth input of Z$b$13 is connected to the output of Z$d$14. Since no further zone unit is connected before the zone unit Z11 and since no further zone unit is connected after zone unit Z14 the fourth input is missing at element Z$a$11 and at the element Z$b$14, respectively.

Within the same zone unit the elements are connected as follows: Element Z$c$ receives two inputs. The first input is connected with the output of element Z$a$ and the second input is connected with the output of element Z$d$. The element Z$d$ also receives two inputs the first of which is from the output of element Z$b$ and the second of which to the output of element Z$c$.

The position elements P$e$ have two inputs. The first thereof is connected with the output of the element Z$b$ of the same index of number and the second thereof is connected with the output of the element Z$c$ having the index of number minus 1. For example, position element P$e$14 has one input connected to the output of Z$d$14 and the other input connected to the output Z$c$13. The outputs of the elements Z$c$ and Z$d$ respectively further lead to corresponding leads LZ$c$ and LZ$d$ respectively. The element P$e$11 has only one input since no further zone units are connected before the zone unit Z11. Also element P$e$15 has only one input since there is no zone unit having the same index of number. The outputs of the elements P$e$ lead on the one hand to the corresponding lead LP with the corresponding index of number and on the other hand to a corresponding signal element PS.

The already mentioned correcting means for the step-by-step device may also directly act onto the zone unit Z if the output of element 43 acts as a third input to the elements Z$d$ and if the output of element 44 acts as a third input to the elements Z$c$.

The floor control according to FIGURES 3 and 3$a$ is provided with cabin push buttons DC supplied over a safety circuit SS as it will be described for FIGURE 4 and over an auxiliary contact KB of the brake B. Further outside push buttons DA corresponding to the number of stops are provided and the supply thereof is guided over a floor contact KF which switches off the outside push buttons DA when the cabin 20 is occupied. The signal of the safety circuit SS is further guided over a lead LSS to the input of an element 50 the output signal of which supplies a lead L50. The output signal has the task to reset the memory elements MS (FIG. 3) and MF (FIG. 3$a$) of the flat control when the safety circuit SS is interrupted. For each stop there is provided a memory element MS consisting of elements S$a$ and S$b$. Each element S$a$ has three inputs the first input being connected with the corresponding push button DA, the second with the corresponding push button DC and the third with the output of the associated element S$b$. Element S$b$ has a first input leading to the output of the associated element S$a$. Further the element S$b$ has two inputs for resetting the memory element MS. One of these inputs is connected to lead L50 and the other to the corresponding lead LP.

From the description of FIGS. 2 and 2$a$ it was shown that the position of the cabin is determinated by the position elements P$e$. In order to render possible a travel of the cabin 20 further elements are required for determining the direction of travelling of the cabin 20. Such elements must be able to ascertain whether a call is present from above or below of the position of the cabin 20. To this end elements F$g$, F$h$, F$i$ and F$k$ are provided. The elements F$g$ and F$h$ serve to determine the downward travel and the elements F$i$ and F$k$ serve to determine the upward travel. The elements F$g$ and F$i$ are floor dependent and have an index of number whereby it must be considered that an upward or downward travel may be started from $n-1$ stops only.

Each element F$g$ has two inputs one of which is connected with the output of the corresponding element S$a$ and the other of which is connected with the corresponding lead LZ$c$. The outputs of the elements F$g$ serve as inputs to an element F$h$ the output of which acts onto a lead LF$h$. Each element has two inputs the first of which leads to the corresponding output of element S$a$ and the second of which leads to the corresponding lead LZ$d$. The outputs of the elements F$i$ serve as inputs to the element F$k$ the output of which is connected to a corresponding lead LF$k$.

The signals of the leads LF$h$ and LF$k$ must be stored during the travelling until the lug F in the desired stop interrupts the signal of the induction switch JS as indicated in FIG. 3$a$. The downward signal to the lead LF$h$ is supplied as input to an element 51 the output of which serves as input to an element F$da$ and to an element 52. The element F$da$ forms a part of a memory element MF$d$ consisting of an element F$da$ and of an element F$db$. The output of element F$db$ is connected with the second input of element F$da$ and the output of element F$da$ is connected with the first input of the element F$db$.

The upward signal to the lead LF$k$ is supplied to an element 54 the output of which serves as first input to an element F$ua$ and as second input to the element 52. The element F$ua$ forms one part of a memory element MF$u$ consisting of the elements F$ua$ and F$ub$. The output of element. F$ub$ is connected with the second input of element F$ua$ and the output of the latter is connected with the first input of element F$ub$. The third input of element 52 is formed by the lead LJS. The output of this element 52 on the one hand leads to an element 53 and on the other hand to the second input of the elements F$db$ and F$ub$. The output of element 53 acts onto a lead LMV. The elements F$db$ and F$ub$ each have a third input connected with the lead L50. The fourth input of element F$db$ leads to the output of the element F$ub$ and the fourth input of element F$ub$ leads to the output of element F$db$. These two connections form a reciprocal locking of the travel direction memory elements. MF$d$ and MF$u$ in order to prevent that both directions of travel from responding simultaneously. The output of elements F$da$ and F$ua$, respectively further act onto leads LF$da$ and LF$ua$, respectively and the output of elements F$db$ and F$ub$ respectively act onto leads LF$db$ and LF$ub$ respectively.

Figure 4:
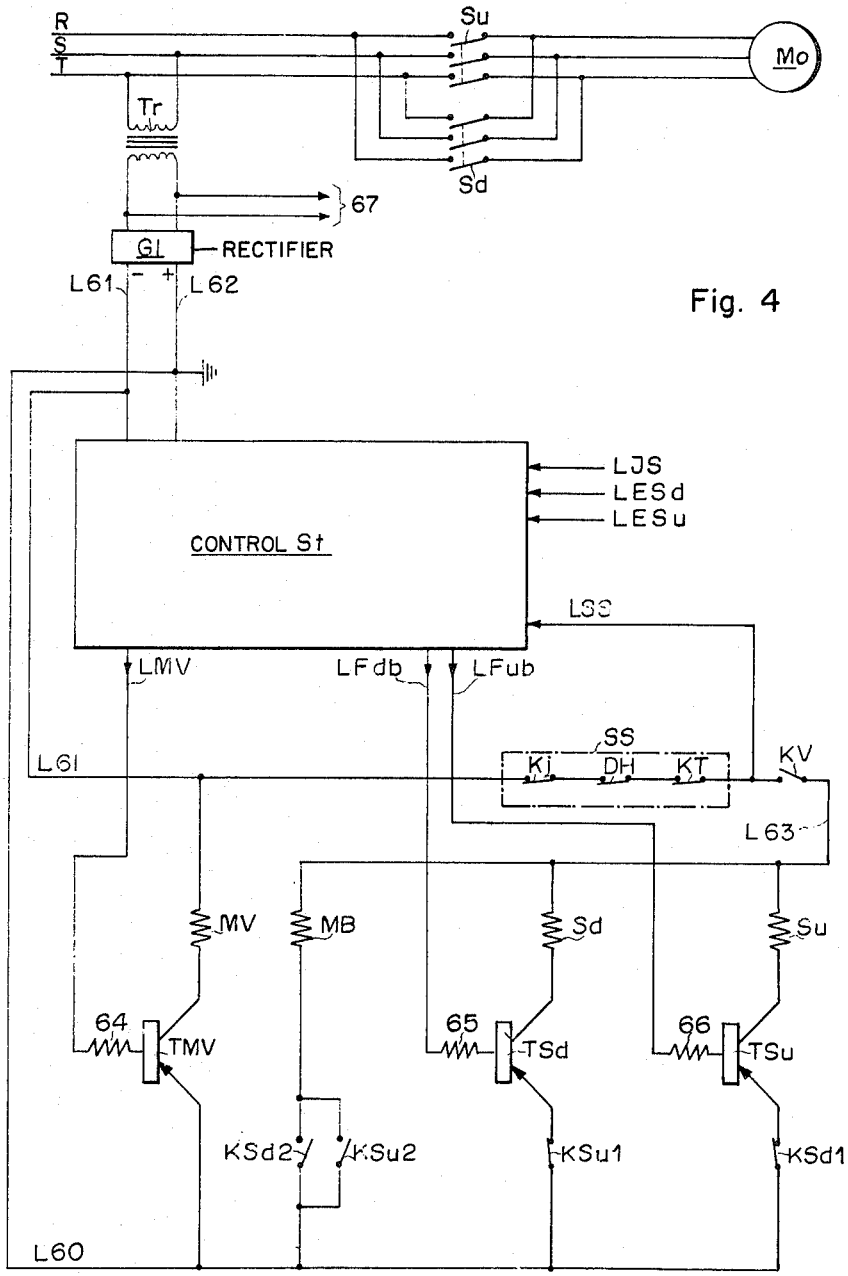
FIG. 4 shows a further part of the elevator control.

The motor M$o$ of the drive is supplied according to FIG. 4 from a mains RST over relays for the direction of travelling S$u$ and S$b$. The primary winding of a transformer T$r$ is connected with the leads S and T, while the secondary winding leads on the one hand to a rectifier G1 and on the other hand over a lead 67 to the primary winding 24 of the induction switch JS, FIGURE 1. One output of the rectifier G1 is connected to grounded lead L60 and the other output to a lead L61. The two leads L60 and L61 supply the control S$t$ which comprises the elements described with respect to FIGS. 2, 2$a$, 3 and 3$a$. The pulsating direct current on the secondary side of the rectifier G1 is smoothed in any well known way. The inputs LJS, LES$d$, LES$u$ and LSS lead to the control S$t$. The object of the first three inputs have already been described. The lead L61 is connected to a safety circuit SS consisting of a contact KJ of the catching device, of a stop button DH and of door contacts KT. The output of the safety circuit SS on the one hand leads over lead LSS to the control S$t$ and on the other hand over contacts KV for the locking check of the door to a lead L63. For the sake of clarity only one of the contacts KT and KV have been represented.

The control S$t$ has the three already described outputs LMV, LF$db$ and LF$ub$. The output LMV is connected via a resistance 64 to the base of a transistor TMV. The emitter of this transistor TMV is connected with the lead L60 and the collector leads over the coil of a door locking magnet MV to lead L61. The output LF$db$ is connected with the base of a transistor TS$d$ via a resistance 65. The emitter of the transistor TS$d$ leads over an auxiliary contact KS$u$1 of the direction switch S$u$ to the lead L60 and the collector of the same transistor is connected with the lead L63 via a relay coil S$d$.

The output LF$ub$ is connected via a resistance 66 with the base of a transistor TS$u$ the emitter of which is connected via an auxiliary contact KS$d$1 with the lead L60 and the collector of which is connected via a relay coil S$u$ with the lead L63. The lead L63 is further connected via the coil of the braking magnet MB and over the auxiliary contacts KS$d$2 and KS$u$2 connected in parallel with the relays S$d$ and S$u$ with lead L60.

The main part of the mentioned "nor"-element according to FIGURE 2 advantageously consists of a transistor T2. See FIG. 5. The inputs are connected with the base of this transistor over voltage responsive resistances, for example those designated by W1, W2, W3 and W4. The emittor of this transistor T2 is grounded while its collector leads over a resistance WC to the negative supplying line L61 of the control. Further the collector is connected with the output 70 of the "nor"-element. Although this particular "nor" circuit has four inputs, the "nor" circuits or static elements used throughout the system may have any number of inputs.

The input resistances W of the "nor"-element may also be replaced by diodes whereby the latter act onto the base over an additional resistance.

Figure 6:
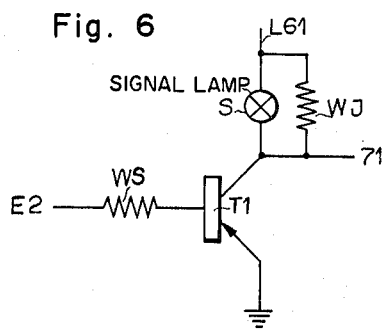
FIG. 6 shows a signal element.

The signal elements PS mentioned in the description are shown for example in FIG. 6. The input is connected via a resistance WS with a base of the transistor T1. Its emitter is grounded and its collector leads over a signal lamp S to the negative supply line L61. The collector is connected with the output 71. A resistance WJ is associated with signal lamp S in order to avoid disturbances of the output effect onto the control should the signal lamp S burn out.

The function of the step-by-step switching device shall now be explained in more detail with an example of cabin travelling. According to the preceding description the cabin 20 is at rest at stop 11. From the description it further appears that the lead LJS (FIG. 2) has a signal 0 and thus that lead L30 carries a signal 1 (element 30 can be considered to be a one input "nor" circuit). Therefore all outputs of the elements Z$a$ and Z$b$ (FIG. 2$a$) are 0. Since the cabin 20 on its last trip was a downward movement to stop 11 the elements Z$c$ have an output 1 and the elements Z$d$ have an output 0. Thus the element P$e$11 has an output 1 while the other elements P$e$ have an output 0. Thus the signal PS11 receives an input 1 resulting in a lightning of the corresponding position lamp.

In the mentioned rest position of cabin 20 the elements of FIG. 2 show the following states: 30=1; 34=0; 35=1; 36=1; 37=0; 38=1; 39=0; 40=0; 41=0; 42=1; 45=0; 46=1; 43=0; and 44=0.

It shall be assumed that the outside calling button DA15 (FIG. 3) is actuated. The signal 1 of the button DA15 brings the outputs of the following elements into the states: Sa15=0; Sb15=1; Fi15=1; Fk=0; 54=1; Fua=0; and Fub=1. Thereby the direction of travelling is determined to "up." The output signal 1 of element 54 (FIG. 3a) further produces the output states 52=0–53=1, whereby through the emittor and the base of transistor TMV (FIG. 4) a control current passes which makes selective the emittor-collector circuit and excites the locking magnet MV. The signal of the direction of travelling LFub produces a control current in transistor TSu. By the excitement of the magnet MV the contact KV is closed the switch Su attracts and the cabin travels upwardly.

Simultaneously the signal of direction of travelling LFub (FIG. 2) produces from the value 1 the following new output states 35=0; 34=1; 41=1; 42=0; 38=0; and 39=1. Thereby 46=0 and 45=1 so that lead L46 carries a signal 0 and lead L45 a signal 1.

Owing to the upward moving of the cabin 20 the induction switch JS (FIG. 1) comes out of the action of the lug F11 so that the lead LJS (FIG. 2) is supplied with a 39=0 and further 30=0. The leads (FIG. 2a) L30, L46 and L35 all carry a signal 0 and the leads L45 and L34 a signal 1. These states result in that all inputs of the element Za11 are 0 while all other elements Za and Zb at least have one input with the value 1. This results in the following new output states: Za11=1; Zc11=0; Zd11=1; Pe11=0; 40=1; 41=0; 38=1; Pe12=1; and 36=0. Since the elements Pe12 has received the output 1 the step-by-step switching device is in position 12. As soon as the induction switch JS reaches the lug F12 the signal carried by lead LJS changes from 1 to 0. This leads to the following new output states: 42=1; 45=0; 46=1; and 30=1. Therefore the output of Za11 becomes 0.

Upon further travelling of the cabin 20 the output state of the elements Za12, Za13 and Za14, respectively, are modified analogously when the induction switch JS leaves the lugs F12, F13 and F14 respectively, resulting in a modification of the state of the elements Pe13, Pe14 and Pe15, respectively.

Figure 3A:
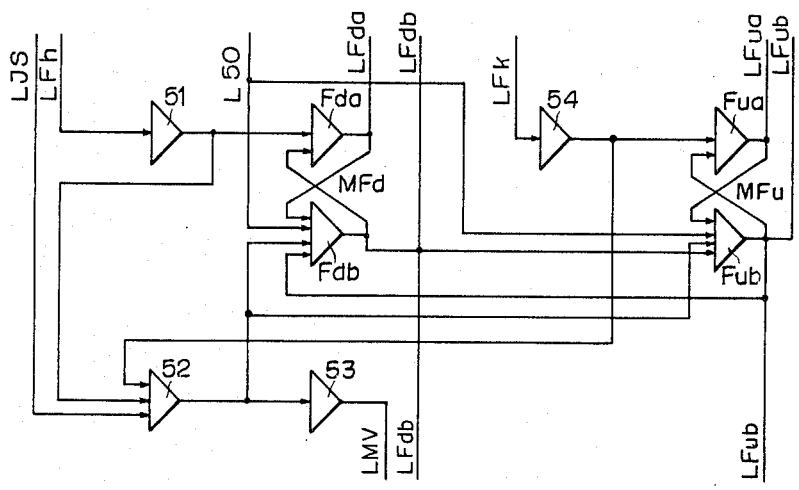

As soon as the position element Pe15 has an output signal 1, the element Sb15 (FIG. 3) receives an output 0 and the element Sa15 an output 1. Simultaneously the output of Zd14 becomes 1 and the following new output states are produced: Fi15=0; Fk=1; 54=0. In spite thereof the elevator continues its upward travel since the order for upward travelling is and remains stored in the memory element MFU (FIG. 3a).

As soon as the sliding path 26 actuates the end switch ESu a signal 0 is produced in lead LESu (FIG. 2). This results in an output 1 for the element 44 and therefore in an output 0 for each of the elements 45 and 46. This further results in all inputs of the elements Za (FIG. 2a) becoming 0 so that all zone units Z are brought into the initial position for downward travelling provided that this had not already happened by the normal control sequence.

As soon as the induction switch JS reaches the lug F15 the signal in lead LJS (FIG. 3a) becomes 0. Since the output signal of element 54 become 0 shortly before the following new output states are produced: 52=1–53=0, which releases the locking magnet MV (FIG. 4). Further, Fub becomes 0 and Fua=1 so that the control signal for the transistor TSu is interrupted and the relay Su is released. The auxiliary contact KSu2 opens and brings to action the brake B.

When the desired stop is reached the output of element 44 (FIG. 2) becomes 0. In this position of the cabin the output values of the elements in the step limiter SB are the following: 40=0; 41=1; 42=0; 36=1; 37=0; 38=0; 39=1; 46=0; and 45=1.

It shall now be assumed that a passenger enters the cabin 20 at stop 15 and actuates the push button DC11. The signal 1 produced by push button DC (FIG. 3) results in the following new output states: Sa11=0; Sb11=1; Fg11=1; Fh=0; 51=1; Fda=0; and Fdb=1. Thereby the direction of travelling "down" is predetermined. The output signal 1 of element 51 (FIG. 3a) further produces the output states 52=0–53=1, so that transistor TMV (FIG. 4) becomes conductive and excites the locking magnet MV. The travel direction signal in lead LFdb produces a control current in transistor TSd. By the excitation of the locking magnet MV the contact KV is closed the relay Sd is excited and the cabin travels downwardly.

Simultaneously the travel direction signal in lead LFdb (FIG. 2) produces from the value 1 the following new output states: 34=0; 35=1; 41=0; 38=1; 39=0; 42=1; 45=0; and 46=1, so that lead L46 has a signal 1 and lead L45 has a signal 0.

By the downward movement of the cabin the induction switch JS leaves the zone of the lug F15 so that the lead LJS is supplied with a signal 1. This results in the following new output states: 42=0 and further 30=0. The leads L30, L45 and L34 (FIG. 2a) carry a signal 0 and the leads L46 and L35 a signal 1. These states result in all inputs of the element Zb14 being 0, while all other elements Za and Zb have at least one input with the value 1. This results in the following new output states: Za14=1; Zb14=0; Zc14=1; Pe15=0; 40=1; Pe14=1; 36=0; 37=1; and 38=0. Since the element Pe14 has received the output 1 the step-by-step switching device is in position 14.

As soon as the induction switch reaches the lug F14 the signal in lead LJS (FIG. 2) changes from 1 to 0. This results in the following new output states: 39=1; 46=0; 45=0; and 30=1. Thus Zb14 becomes 0 (FIG. 2a).

Upon further travelling of the cabin the output states of the elements Zb13, Zb12 and Zb11, respectively are modified analogously when the induction switch JS leaves the lugs F14, F13 and F12 respectively resulting in a modification of the state of the elements Pe13, Pe12 and Pe11 respectively.

As soon as the position element Pe11 receives an output signal 1 the element Sb11 (FIG. 3) modifies its output to 0 and the element Sa11 to 1. Simultaneously the output of Zc11 becomes 1 and the following new output states are produced: Fg11=0; Fh=1; and 51=0. However, the elevator continues its downward travel since the order for downward travelling is and remains stored in the memory element MVd (FIG. 3a).

As soon as the sliding path 26 actuates the end switch ESd a signal 0 is produced in lead LESd (FIG. 2). This results in an output 1 for the element 43 and therefore in an output 0 for the elements 45 and 46 each. This further results in that all inputs of the elements Zb (FIG. 2a) becomes 0 so that all zone units are brought into the initial position for upward travelling provided that this has not already happened by the normal control sequence.

As soon as the induction switch JS reaches the lug F11 the signal in lead LJS (FIG. 3a) becomes 0. Since the output signal of the element 51 became 0 shortly before, the following new output states are produced: 52=1; 53=0; so that the locking magnet MV (FIG. 4) is released. Further Fdb=0 and Fda=1, so that the control signal for the transistor TSd is interrupted and the relay Sd is released. The auxiliary contact KSd2 opens and brings to action the brake B.

When the desired stop is reached the output of element 43 (FIG. 2) becomes 0. In this position of the cabin 20 the output values of the elements in the step limiter SB are the following: 36=1; 37=0; 38=1; 39=0; 40=0; 41=0; 42=1; 45=0; and 46=1.

In the described embodiment, the step-by-step switching device used was of the type with two opposite directions of movement, i.e., the step-by-step switching device is moved by means of the signal stepwise in the one or in the other of the predetermined directions. For other purposes, for example for frequency registration of elevators a step-by-step switching device may be required which move stepwise in one direction only and according to the conditions are periodically brought back into their starting position. An embodiment of such a step-by-step switching device is shown in FIGS. 7 and 7a.

For the sake of clarity the connection of the elements in these figures is described only so far as it differs from the connection of the analogous elements in FIGS. 2 and 2a. However, in order to avoid confusion analogous elements are provided with an additional index 1.

Figure 7:
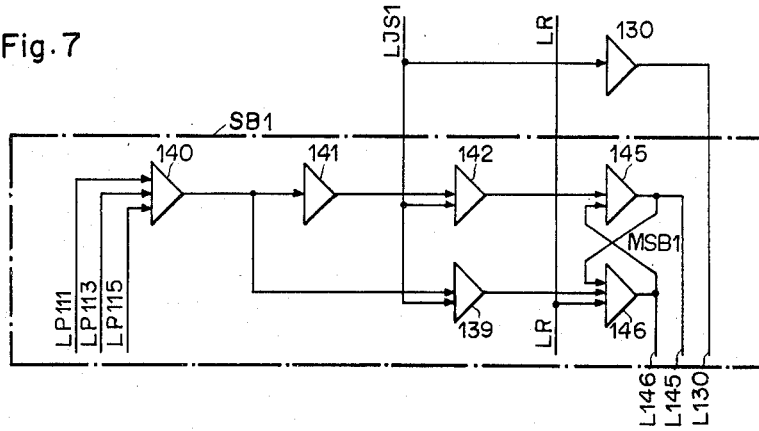
FIG. 7 shows a step limiter for a step-by-step switching device with one direction of movement.
Figure 7A:
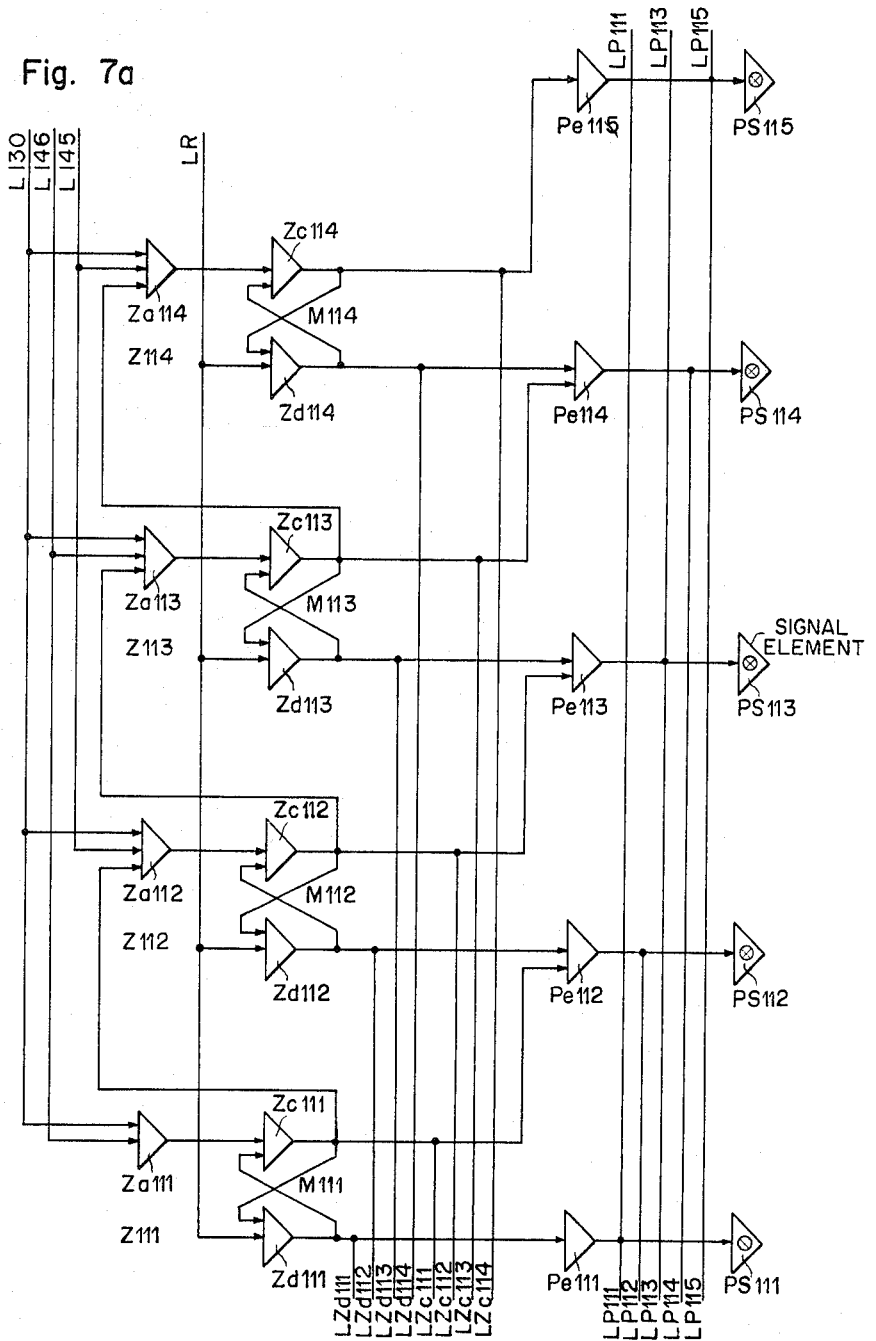
FIG. 7a illustrates zone units and corresponding position and signal elements for a step-by-step switching device having one direction of movement.

Since the step-by-step switching device according to FIGS. 7 and 7a switches stepwise only in one direction only one element, namely the element Za is connected in front of each memory element M of the zone units Z111 to Z114 and this element Za for the same reason has only a reduced number of inputs. In order to be able to bring the step-by-step switching device into the starting position a resetting signal 1 is supplied to the elements Zd over a lead LR. This signal may, according to the purpose of the step-by-step switching device be produced for example periodically from a switch clock or from the end position. For the same reason the step limiter SB1 in FIG. 7 does not present the elements 36, 37 and 38 of FIG. 2 and the element 141 does no more present the direction responsive input. Further the first input of element 139 is connected with the output of element 140. In place of the correcting means acting onto the memory element MSB the element 146 of memory element MSB1 presents an input connected to lead LR.

If for example this step-by-step switching device is used as a counter the following switching functions are given: The outputs of the elements in the starting positions are: 130=1, and thus Za=0; Zc=1; Zd=0; Pe111=1; 140=0; 141=1; 142=0; 139=1; 146=0; 145=1; Pe112 to Pe115=0.

A signal, for example from a generator of the brake of an elevator, transmitted over lead LJS1 results in the following new output states: 139=0; 130=0; Za111=1; Zc111=0; Zd111=1; Pe111=0; 140=1; 141=0; Pe112=1. As soon as the signal in lead LJS1 disappears the following new output states are produced: 142=1; 145=0; 146=1; 130=1. With each signal the step-by-step switching device effects a further step in analogous manner. As soon as a signal 1 appears in lead LR the step-by-step switching device is reset into the starting position. The leads LP111 to LP115 may be connected to a not represented pressure writer registering in time intervals the position of the step-by-step switching device.

In order to avoid undesired traffic maximums of an elevator plant one of the leads LZ may be guided to a traffic maximum frequence device which renders impossible to the elevator to exceed per time unit the desired frequence.

Moreover, the invention may be carried out with other static elements such as for example with "and," "or," "no" and memory elements.

We claim:

1. An elevator control system for moving an elevator cabin between floors comprising in combination: a plurality of bistable signal storage units, pairs of which correspond to respective of the floors, each floor having also associated therewith storage units corresponding to adjacent floors, alternate storage units of said plurality forming a first group connected in series and the remaining storage units of said plurality forming a second group of storage units connected in series, the storage units of said first storage unit group having one state and the storage units of said second storage unit group having the opposite state when the cabin is located at one of the end floors; signal generating means disposed on each floor and actuatable by the cabin when the latter moves adjacent the respective floors; signal transfer means actuated by said signal generating means and adapted to transfer the signals of said signal generating means to a storage unit in each of said storage unit groups adjacent the endmost unit when the cabin leaves the corresponding end floor, and to one of the adjacent storage units in each of said storage unit groups when the cabin is located at an intermediate floor and is to move towards one of said end floors, said storage units being adapted to change state upon receiving a signal from said signal transfer means; floor call units associated with each floor and adapted to generate a signal corresponding to one of said floors; and first and second means for generating directional signals, said first directional signal generating means being operatively and selectively connected to said storage units of said first storage unit group and to the resepctive floor call units and said second directional signal generating means being operatively and selectively connected to said storage units of said second storage unit group and to the respective floor call units, said directional signal generating means being responsive to the signals of the floor call units and the states of the storage units so that only one of said directional signal generating means is operative at any one time as determined by the operated floor call unit and the position of said cabin as indicated by the states of said storage units.

2. An elevator control system for moving an elevator cabin between landings comprising, in combination, a plurality of positions indicating elements arranged in pairs associated with respective landings, each of said position indicating elements including an output; a step-by-step switching means comprising a plurality of step units, each associated with each pair of adjacent position elements, and each including a memory element having a first and a second output and two inputs, the first output of each memory element being operatively connected to the one of said pair of associated positions indicating elements which is associated to the lower landing and the second output of each memory being operatively connected to the second of said associated position indicating elements; each of said step units further comprising two NOR gates including input means and an output, the output of each of said NOR gates being operatively connected to an input of the corresponding memory element, means for connecting the output of each memory element, connected with the associated position indicating element corresponding to the higher landing, to the input means of the NOR gate of the adjacent step unit which is operatively connected through the corresponding memory element with the one of the position indicating elements associated to the same memory element which corresponds to the higher landing, means for connecting the output of each memory element, connected with the associated position indicating element corresponding to the lower landing, to the input means of the NOR gate of the adjacent step unit which is operatively connected through the corresponding memory element with the one of the position elements associated with the same memory element corresponding to the lower landing; call units each associated with a landing and each comprising inside and outside call button means for generating a signal and a call unit memory element including input means, means for connecting said input means to the corresponding call button means and means for connecting said input means to the output of the corresponding position indicating element, each of said call unit memory elements having one output, a plurality of output detecting units each associated with a call unit and controlled by the memory elements thereof, each of said output detecting units having first switching means responsive to the first step unit output connected to the next lower position indicating element and having second switching means responsive to the second step unit output connected to the next higher position element; a first and a second NOR gating means including input means and outputs, the outputs of said first and said second switching means being connected to the input means of said first and second NOR gating means respectively; a direction switch having a first input for indicating upwards movement and a second input for indicating downwards movement, the output of said first NOR gating means being connected to the first input of said direction switch, and the output of said second NOR gating means being connected to the second input of said direction switch; and means responsive to the indication of said direction switch for moving the elevator cabin selectively upwardly and downwardly.

References Cited by the Examiner
UNITED STATES PATENTS

| | | | |
|---|---|---|---|
| 2,715,678 | 8/1955 | Barney | 340—168 |
| 2,934,170 | 4/1960 | Yeasting | 187—29 |
| 2,938,604 | 5/1960 | O'Grady et al. | 187—29 |
| 2,964,735 | 12/1960 | Abbott | 340—168 |

NEIL C. READ, *Primary Examiner.*

BENNETT G. MILLER, *Examiner.*